United States Patent [19]

Roche

[11] 3,890,600

[45] June 17, 1975

[54] BUFFER STORES

[75] Inventor: Francis G. Roche, London, England

[73] Assignee: Cable & Wireless Limited of Smale House, London, England

[22] Filed: Dec. 7, 1973

[21] Appl. No.: 422,514

[30] Foreign Application Priority Data

Dec. 11, 1972 United Kingdom .............. 57074/72

[52] U.S. Cl. .............................................. 304/172.5

[51] Int. Cl. .............................................. G11c 21/00

[58] Field of Search .................... 340/172.5, 174.1 P

[56] References Cited

UNITED STATES PATENTS

| | | | |
|---|---|---|---|
| 3,430,211 | 2/1969 | Foure et al. | 340/172.5 |
| 3,471,835 | 10/1969 | Gribble et al. | 340/172.5 |
| 3,587,062 | 6/1971 | Jen | 340/172.5 |
| 3,599,177 | 8/1971 | Jen | 340/172.5 |
| 3,634,832 | 1/1972 | Taddei | 340/172.5 |
| 3,636,519 | 1/1972 | Heath | 340/172.5 |
| 3,648,255 | 3/1972 | Beausoleil et al. | 340/172.5 |

*Primary Examiner*—Gareth D. Shaw
*Assistant Examiner*—John P. Vandenburg
*Attorney, Agent, or Firm*—Kemon, Palmer & Estabrook

[57] ABSTRACT

A method of controlling the entry and removal of characters from a recirculating buffer store is described. The buffer store has a plurality of data storage channels within which the respective bits or elements of a character entered into the store are circulated, and an index bit of the same given polarity is entered into an index storage channel each time a character is entered in the store. The method further comprises recirculating the bits in the index channel in synchronism with the bits in the data channels, sensing the singal level at the output of the final bit location in the index channel, generating a write enable signal to permit the entry of a new character into the store only in response to a transition of the sensed index signal level in a first direction, and generating a read enable signal to permit the removal of a character from the store only in response to an index signal transition in the opposite direction.

4 Claims, 3 Drawing Figures

BUFFER STORES

This invention relates to an indexing circuit for a recirculating buffer store. The store will generally consist of a parallel array of recirculating shift registers so arranged that a character containing several bits or elements is entered into the store by feeding the bits or elements in parallel to respective shift registers. However the invention may also be applied to stores consisting of magnetic tapes, discs or drums having a number of parallel tracks for the respective bits or elements of a character.

In many instances it is desirable that the readout of characters from a buffer store should occur without disturbing the original sequence in which the characters were entered into the store, for example where the successive characters form a telegraph message. Since at any instant the exact position of a character in a recirculating buffer store is not known, some means must be found for detecting each time the "oldest" character in the store reaches the output of the store. Since new characters are likely to arrive at the store input at irregular intervals it is also necessary to detect each time the most recently stored character passes the input of the store so that a new character can be entered into the next adjacent bit locations of the store behind the preceding character.

Stores of this type are already known and are sometimes referred to as Fifo (first in, first out) stores. However the indexing circuits for these stores are complex and the stores are therefore costly to manufacture.

In accordance with the present invention a method of controlling the entry and removal of characters from a recirculating buffer store having a plurality of data storage channels within which the respective bits or elements of a character entered into the store are circulated, comprises entering an index bit of the same given polarity into an index storage channel each time a character is entered into the store, recirculating the bits in the index channel in synchronism with the bits in the data channels, sensing the signal level at the output of the final bit location in the index channel, generating a write enable signal to permit the entry of a new character into the store only in response to a transition of the sensed index signal level in a first direction, and generating a read enable signal to permit the removal of a character from the store only in response to an index signal level transition in the opposite direction.

Where the store consists of a parallel array of recirculating shift registers, each bit is fed into one end of a shift register and is then progressively shifted through the register by means of clock pulses. When the bit reaches the final storage location of the register, the next clock pulse transfers it back into the first storage location and the bit is therefore continuously circulated around the store at a speed determined by the clock pulse generator. The time taken for a complete revolution is therefore dependent on the clock pulse frequency and the capacity of the store. A very large capacity will therefore prevent a high input data rate and the invention is therefore primarily concerned with a small capacity store.

Since the group of bits which is built up in the index channel all have the same polarity, the read and write enable signals will only be generated at the beginning and at the end of this group of bits, and there will be one read enable signal and one write enable signal generated for each complete revolution of the bits in the index channel.

In order that the invention may be more clearly understood one example will now be described with reference to the accompanying drawings in which.

Figure 1:
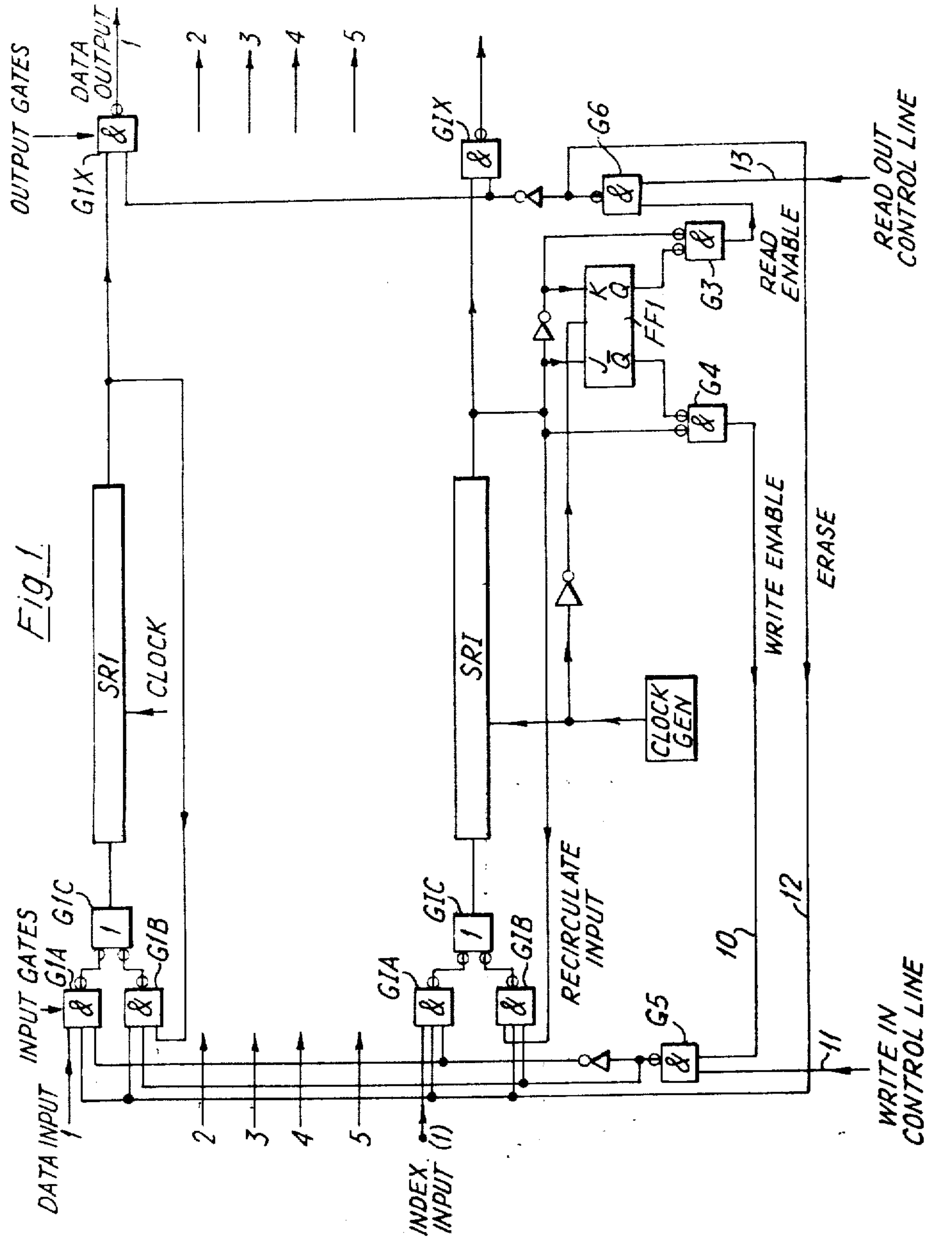
FIG. 1 is a circuit diagram of a recirculating buffer store including the indexing circuit.

In FIG. 1 a parallel array of five multi-bit shift registers form a buffer store which receives 5 bit characters appearing on the data input lines 1 to 5. For the sake of clarity only the first shift register SR1 is illustrated but the remaining four registers with their associated input and output gates are identical and function in exactly the same manner. The first shift register SR1 stores the first bit of each successive character, the second register stores the second bit, and so on. An additional index shift register SRI is filled with a 1 each time a character is entered in the data shift registers.

The data shift registers and the index shift register are driven from a common clock generator and the bits are recirculated through the registers by returning the respective outputs to one of the input gates. Thus the output from shift register SR1 is fed back to input gate G1B for transference into the first stage of the register through OR-gate G1C. Similarly the output from the index shift register SRI is fed back to input gate GIB for transference into the first stage of the index shift register through OR-gate GIC.

Fresh data is entered into the shift registers in response to a "write enable" signal on line 10 and a "write in" signal on control line 11. The output from gate G5 then inhibits gates G1B and GIB but, after inversion, enables the input gates G1A and GIA.

The third input to the input gates is an "erase" input along line 12. These erase inputs are normally at 1 but change to a 0 when a character is read out from the store so that a character which is read out is not recirculated back into the shift registers.

Figure 3:
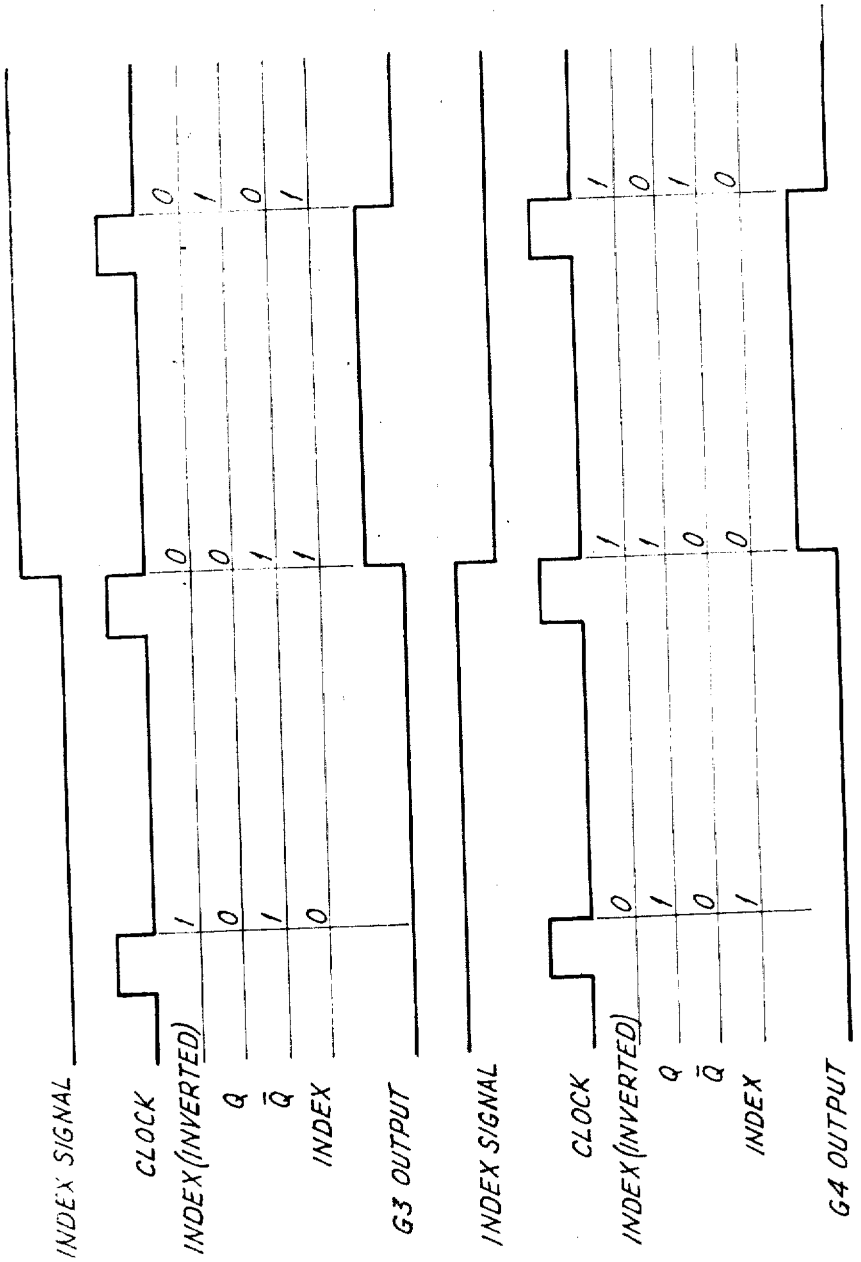
FIG. 3 is a waveform diagram illustrating the operation of the indexing circuits in FIG. 1.

The read/write gates comprise a J-K flip flop FF1 and a pair of gates G3, G4 which only give an output when both their inputs are at 0. The action of this part of the circuit can best be understood by reference to the waveform diagram of FIG. 3. This figure illustrates the values of the four gate inputs to G3 and G4 after each of three successive clock pulses, firstly when the index signal changes from 0 to 1 at the trailing edge of the second clock pulse, and secondly when the index signal changes from 1 to 0 at the training edge of the second clock pulse. The inputs to the gate G3 comprise the Q output of flip flop FF1 and the inverted index signal. These are only both at 0 immediately following a 0–1 transition of the index signal. Similarly the two inputs to gate G4 (the index signal and $\overline{Q}$) are only both at 0 immediately following a 1–0 transition of the index signal. At all other times the outputs from G3 and G4 will be inhibited.

The output from G4 comprises the write enable signal on line 10 so that a new character can only be written into the store immediately following a 1–0 transition of the index signal. Since a 1 is entered into the index register each time a new character is entered into the buffer store, a 1–0 transition will only occur when the last character written in the store appears at the output of the store. The appearance of a character at the output of the store occurs simultaneously with the feeding of that character back into the first stage of the store (unless an erase signal is present). Thus each new character will be fed in immediately behind the last character written into the store and the original sequence of characters in the store will be maintained.

It is important of course that the whole of the index shift register should not become filled with 1's so that when all but one of the bit locations in the index shift register have been filled an inhibit signal is generated indicating that the store is full.

The output from the gate G3 comprises a read enable signal which is fed to a read-out gate G6. A read enable signal will be generated once during each revolution of the bits in the index shift register, but read out of a character will only occur if a "read out" signal is also present on the read out control line 13. Since the read enable signal is only generated in response to a 0–1 transition of the index signal, only the first of the characters written into the buffer store (the oldest character) can be read out in response to a read out demand signal on the control line 13.

Figure 2:
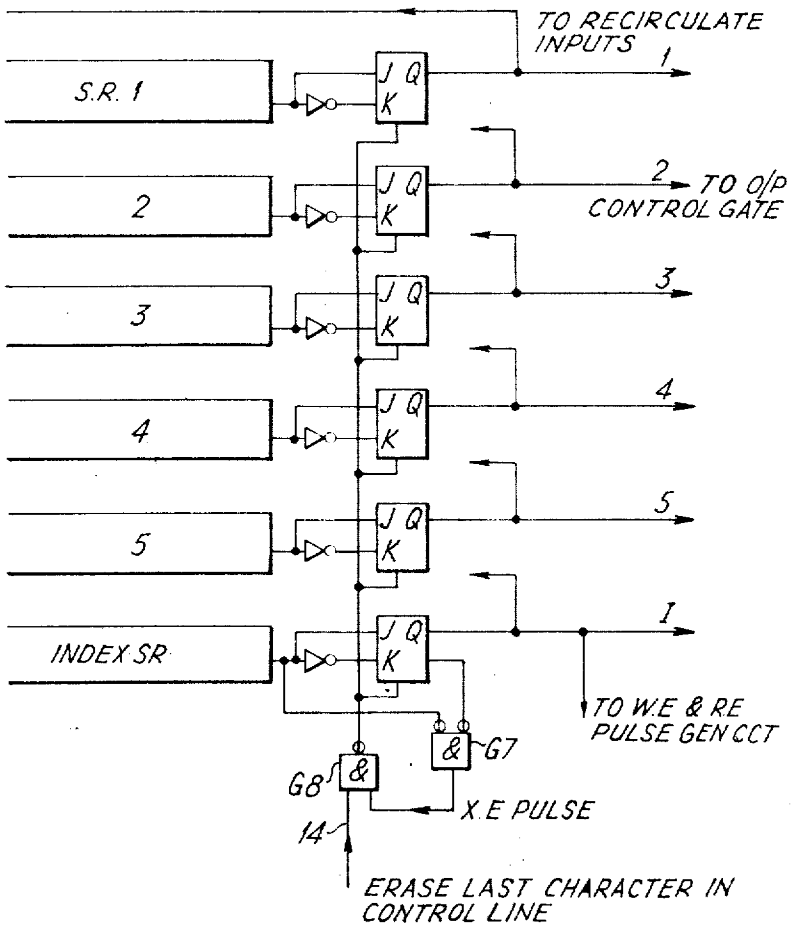
FIG. 2 is a circuit diagram of an additional circuit which may be added to the circuit of FIG. 1 to permit erasure or extraction of the last character written into the store.

FIG. 2 shows the output of the five data shift registers and the index shift register of FIG. 1 connected to an additional stage which essentially comprises a J–K flip flop for each register. The purpose of this additional stage is to isolate the last character written into the store from the remaining characters in the store. This character can then be erased or extracted to correct an error. The correct character is then entered when the next "write enable" signal is generated. An "extraction enable" pulse (X.E. pulse) is generated from gate G7 whenever the inputs to the gate are both at 0. Since the inputs to the gate G7 essentially correspond to the inputs to gate G4, this will occur only in response to a 1–0 transition of the index signal as the last character written into the store is transferred into the additional stage. If it is desired to erase this last character, a signal is fed to the gate G8 along control line 14. The output from gate G8 is connected to the clear inputs of the J–K flip flops.

A simplified example of the operation of the indexing circuit will now be described assuming that each shift register has a capacity of 8 characters. In practice each register would typically hold 1024 characters.

Assume that a message consisting of four characters has already been entered into the buffer store and that the first bits of the four characters are 1101 respectively. This group of bits is continuously circulated through the shift register SR1 and after **8*n*** clock pulses will occupy the final four slots of the register where *n* is the number of completed revolutions.

The following table A illustrates the next revolution of the group of bits in the shift register SR1 together with the corresponding group of one's in the index register SRI, and shows how the first bit X of a new character is entered in the first register in response to a 1–0 transition at the output of the index register.

TABLE A

| Clock Pulse | First Shift Register | Index Shift Register |
|---|---|---|
| 8n | 0 0 0 0 1 1 0 1 | 0 0 0 0 1 1 1 1 |
| 8n + 1 | 1 0 0 0 0 1 1 0 | 1 0 0 0 0 1 1 1 |

TABLE A-Continued

| Clock Pulse | First Shift Register | Index Shift Register |
|---|---|---|
| 8n + 2 | 0 1 0 0 0 0 1 1 | 1 1 0 0 0 0 1 1 |
| 8n + 3 | 1 0 1 0 0 0 0 1 | 1 1 1 0 0 0 0 1 |
| 8n + 4 | 1 1 0 1 0 0 0 0 | 1 1 1 1 0 0 0 0 |
| 8n + 5 | X 1 1 0 1 0 0 0 | 1 1 1 1 1 0 0 0 |
| 8n + 6 | 0 X 1 1 0 1 0 0 | 0 1 1 1 1 1 0 0 |
| 8n + 7 | 0 0 X 1 1 0 1 0 | 0 0 1 1 1 1 1 0 |
| 8(n + 1) | 0 0 0 X 1 1 0 1 | 0 0 0 1 1 1 1 1 |

The table shows that a 1–0 transition occurs at the output of the index shift register in response to the $(8n+4)^{th}$ clock pulse. The resulting write enable pulse is fed to the input gates of the first shift register. On the next clock pulse $(8n + 5)$ the first bit X of the new character is therefore fed into the first storage slot in the first register. It can be clearly seen that this new bit X is automatically entered in the next adjacent slot following the 1101 sequence. Similarily it can be seen that the original 1 in the group of bits (the first 1 written into the store) will be read out in response to a 0–4 transition at the output of the index shift register. The 0–1 transition occurs at the $(8n + 1)^{th}$ clock and the resulting read enable pulse erases the 1 bits which would have been entered in the first slots of the first shift register and the index shift register.

In a telegraph system embodying the invention, the "start" pulse at the beginning of each character in a telegraph signal is conveniently used to transfer a 1 into the index register of the buffer store each time a character is entered into the character shift registers. The absence of a 1 in the index register is initially sensed so that a 1 can be entered in order to generate the first read and write enable signals.

One method of generating the write inhibit signal when only one space is left in the store (so that the index shift register does not become filled with 1's is as follows. Instead of connecting the output of gate G4 directly to the input of gate G5, it is connected to the trigger input of a further flip-flop which has its "clear" input connected to the output of gate G3. When only one space is left in the index shift register a write enable pulse from G4 is immediately followed by a read enable pulse from G3. Normally, the write enable pulse will trigger the flip-flop such that its Q output changes from 0 to 1 at the end of the pulse. However, when the write enable pulse is immediately followed by a read enable pulse this 0–1 transition is only momentary because the flip-flop is immediately cleared and the Q output reverts to its low state.

The Q output from this additional flip-flop is then fed to an AND gate together with a delayed clock pulse, and the output from the AND gate triggers another flip-flop having its Q output connected to one of the inputs of gate G5 (the line 10 input of FIG. 1). Thus, normally each write enable pulse produces a corresponding output pulse from the second additional flip-flop, but when only one space is left in the index shift register this output will be inhibited. The second additional flip-flop is cleared by the output from gate G5.

An OR gate may be inserted between the output of the AND gate and the second additional flip-flop with one of its inputs connected to receive a start-up reset pulse.

I claim:

1. A method of controlling the entry and removal of characters from a recirculating buffer store having a plurality of data storage channels within which the respective bits or elements of a multi-bit character entered into the store are circulated, the method comprising entering an index bit of the same given polarity into an index storage channel each time the bits of a character are entered into the respective data storage channels such that the number of index bits accumulated in the index channel always corresponds to the number of data bits accumulated in each data channel, the index channel having the same number of bit locations as the data channels, recirculating the bits in the index channel in synchronism with the bits in the data channels, sensing the signal level at the output of the final bit location in the index channel, generating a write enable signal to permit the entry of a new character into the store only in response to a transition of the sensed index signal level in a first direction, and generating a read enable signal to permit the removal of a character from the store only in response to an index signal level transition in the opposite direction whereby a block of bits of the same polarity and occupying adjacent bit locations is accumulated in the index channel, the leading and trailing edges of the block controlling the removal and entry of characters from and into the store respectively.

2. A method according to claim 1 further comprising isolating the final bit location of the data and index storage channels, sensing the index signal level at the input of the final bit location of the index storage channel and generating an extraction enable signal to permit extraction of the character stored in the final bit locations of the store only in response to a transition in the said first direction of the sensed index signal level at the input of the final bit location.

3. A recirculating buffer store comprising a plurality of data storage channels each having means responsive to the output from the final bit location of the channel for recirculating the respective bits of a character entered into the store, each character having an associated index bit being of the same give polarity, and the store further comprising an index storage channel having the same number of bit locations as the data storage channels for storing the index bits, means for recirculating the bits in the index channel in synchronism with the bits in the data channels, means for sensing the index signal level at the output of the final bit location in the index channel, the sensing means having a first ouput representing an index signal level transition in a first direction and a second output representing a transition in the opposite direction, first gating means connected to receive the first output from the sensing means and controlling the entry of characters into the store in response to a write-in command, and second gating means connected to receive the second output from the sensing means and controlling the removal of characters from the store in response to a read-out command.

4. A buffer store according to claim 3 in which the final bit locations of the data storage channels and the index storage channel each include accessible inputs and in which the sensing means includes means for sensing the level of the index signal at the input of the said final bit location in the index storage channel, the store further including third gating means connected to the sensing means and responsive to a transition in the index signal level in the first direction at the input of the final bit location for controlling the extraction of the character stored in the final bit locations of the store in response to an erase last character command signal.

* * * * *